US011094095B2

(12) United States Patent
Chapman et al.

(10) Patent No.: US 11,094,095 B2
(45) Date of Patent: Aug. 17, 2021

(54) FOCAL LENGTH COMPENSATED AUGMENTED REALITY

(71) Applicant: Disney Enterprises, Inc., Burbank, CA (US)

(72) Inventors: Steven M. Chapman, Burbank, CA (US); Joseph Popp, Burbank, CA (US); Mehul Patel, Burbank, CA (US); Calis Agyemang, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 0 days.

(21) Appl. No.: 15/806,228

(22) Filed: Nov. 7, 2017

(65) Prior Publication Data

US 2019/0139281 A1 May 9, 2019

(51) Int. Cl.
H04N 5/232 (2006.01)
G06T 11/60 (2006.01)
H04N 5/272 (2006.01)
G06K 9/00 (2006.01)
H04N 5/262 (2006.01)

(52) U.S. Cl.
CPC .......... G06T 11/60 (2013.01); G06K 9/00255 (2013.01); H04N 5/23296 (2013.01); H04N 5/2628 (2013.01); H04N 5/272 (2013.01)

(58) Field of Classification Search
None
See application file for complete search history.

(56) References Cited

U.S. PATENT DOCUMENTS

| 8,913,004 | B1* | 12/2014 | Bozarth | G09G 5/006 345/156 |
| 2013/0176208 | A1* | 7/2013 | Tanaka | G06F 3/013 345/156 |
| 2014/0098264 | A1* | 4/2014 | Koike | H04N 5/262 348/240.99 |
| 2014/0184854 | A1* | 7/2014 | Musatenko | H04N 5/23296 348/240.2 |
| 2015/0002393 | A1* | 1/2015 | Cohen | G06F 3/012 345/156 |
| 2015/0172550 | A1* | 6/2015 | Bretscher | H04N 5/23293 348/140 |
| 2015/0370071 | A1* | 12/2015 | Alton | G02F 1/1313 349/11 |
| 2017/0337898 | A1* | 11/2017 | Liao | G09G 3/3406 |
| 2018/0277033 | A1* | 9/2018 | Jia | G06F 3/013 |
| 2019/0007618 | A1* | 1/2019 | Sokeila | H04N 5/2252 |

* cited by examiner

Primary Examiner — Kyle Zhai
(74) Attorney, Agent, or Firm — Dorsey & Whitney LLP

(57) ABSTRACT

The present disclosure is directed to presenting a more realistic augmented reality view on a video see-through display of a device by configuring the device such that the displayed image of the real world substantially matches what would be perceived by the user if the display were not present. This may be implemented by determining one or more of: a distance from the user's eyes to the display of the device, and an angular offset between the optical axis of a rear camera of the device and the user's visual field, and using the determined distance and/or angular offset to adjust the image that is displayed to the user. The image that is displayed to the user may be adjusted by optically or digitally zooming the rear camera of the device. It may also be adjusted by tilting the rear camera or by digitally translating the displayed video feed.

16 Claims, 12 Drawing Sheets

FOCAL LENGTH COMPENSATED AUGMENTED REALITY

TECHNICAL FIELD

The present disclosure relates generally to augmented reality technology.

DESCRIPTION OF THE RELATED ART

Being immersed in augmented reality using a handheld mobile device or other augmented reality capable device, may be an engaging and unique experience.

BRIEF SUMMARY OF THE DISCLOSURE

Techniques described herein are directed to presenting a more realistic augmented reality view on a video see-through display of a device by configuring the device such that the displayed image of the real world substantially matches what would be perceived by the user if the display were not present.

In one embodiment, a method includes: capturing and displaying a video feed of a real-world environment using a rear-facing camera of an augmented reality (AR) device of a user; determining a distance from a facial point of the user to a display of the AR device; based on at least the determined distance, digitally or optically zooming the video feed of the real-world environment; and after zooming the video feed, rendering an augmented reality object overlaid over the video feed. In implementations, the augmented reality device may be a handheld video see-through augmented reality device such as a smartphone or tablet.

In implementations, based on at least the determined distance, the rear-facing camera is optically zoomed by translating a zoom lens of the rear-facing camera. Alternatively, based on at least the determined distance, the displayed video feed may be digitally zoomed. The video feed of the real-world may be zoomed to match the displayed video feed to an image of the real-world environment that would be perceived by the user without the presence of the display.

In implementations, determining a distance from the facial point of the user to the display of the AR device includes: determining a plurality of distances from the user's eyes to a respective plurality of points of the display of the AR device. In particular implementations, determining a distance from a facial point of the user to the display of the AR device includes scanning the user's face using a front-facing infrared illuminator and infrared camera of the AR device.

In some implementations, the method further includes: determining an angular offset between an optical axis of the rear-facing camera and a visual field of the user; and based on at least the determined angular offset, tilting the rear-facing camera or digitally translating the video feed displayed to the user. Based on at least the determined angular offset, the rear-facing camera may be tilted to match the displayed video feed to an image of the real-world environment that would be perceived by the user without the presence of the display. Alternatively, based on at least the determined angular offset, the video feed may be digitally translated to match the displayed video feed to an image of the real-world environment that would be perceived by the user without the presence of the display.

In one embodiment, a device includes: a display; a rear-facing camera; a processor; and a non-transitory computer-readable medium having instructions stored thereon that, when executed by the processor causes the device to: capture and display a video feed of a real-world environment using the rear-facing camera; determine a distance from a facial point of a user of the device to the display; based on at least the determined distance, digitally or optically zoom the video feed of the real-world environment; and after zooming the video feed, render an augmented reality object overlaid over the video feed. The rear-facing camera may include a zoom lens, and based on at least the determined distance, the rear-facing camera may be optically zoomed by translating the zoom lens.

In implementations, the device further includes: a front-facing camera system including an infrared illuminator and infrared camera that may be used to scan the user's face. In implementations, the device further includes: a tilt actuator for tilting the rear-facing camera.

In one embodiment, a method includes: capturing and displaying a video feed of a real-world environment using a rear-facing camera of an AR device of a user; determining a position of the user's eyes relative to a display of the AR device; based on the determined position of the user's eyes, determining an angular offset between an optical axis of the rear-facing camera and a visual field of the user; based on at least the determined angular offset, tilting the rear-facing camera or digitally translating the displayed video feed to match the displayed video feed to an image of the real-world environment that would be perceived by the user without the presence of the display; and after tilting the rear-facing camera or digitally translating the video feed, rendering an augmented reality object overlaid over the video feed.

As used herein, the term "augmented reality" or "AR" generally refers to a view of a physical, real-world environment that is augmented or supplemented by computer-generated or digital information such as video, sound, and graphics. The digital information is directly registered in the user's physical, real-world environment such that the user may interact with the digital information in real time. The digital information may take the form of images, audio, haptic feedback, video, text, etc. For example, three-dimensional representations of digital objects may be overlaid over the user's view of the real-world environment in real time.

Other features and aspects of the disclosed method will become apparent from the following detailed description, taken in conjunction with the accompanying drawings, which illustrate, by way of example, the features in accordance with embodiments of the disclosure. The summary is not intended to limit the scope of the claimed disclosure, which is defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments of the disclosure.

The figures are not exhaustive and do not limit the disclosure to the precise form disclosed.

DETAILED DESCRIPTION

Current augmented reality (AR) devices that have video see-through displays that are viewed at a distance (e.g., smartphones and tablets) are limited in "believability" by their fixed-focal length and fixed optical axis camera devices. Looking at an AR object on a table should appear as though one were looking through an empty, glassless frame. However, because of the fixed focal length of the rear facing camera, current AR experiences are limited by an effect of the camera's focal length. For example, because of the wide-angle lens that is typically used in a smartphone's rear facing camera, the smartphone's display will show objects surrounding an AR object that should not be shown on the display because they are visible by the user in the real-world outside the smartphone's frame.

Figure 1A:
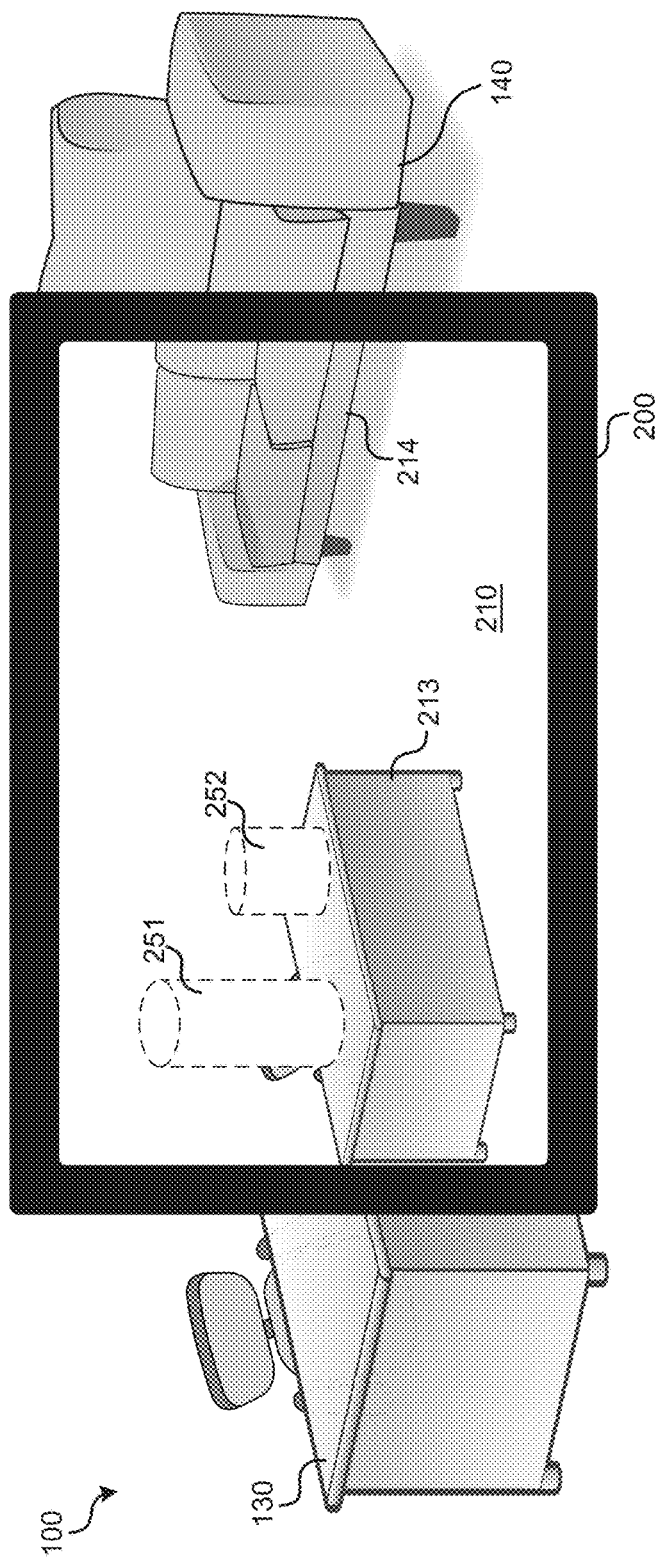
FIG. 1A illustrates a real-world environment, including a display of a handheld mobile device, as seen by a user's eyes, using a conventional video see-through AR device.

This problem is illustrated by FIG. 1A, which shows a real-world environment 100, including a display of a handheld mobile device 200, as seen by a user's eyes 110A-110B. As illustrated in this example, the user holds a mobile device 200 in a real-world environment including a desk 130 and couch 140. The mobile device includes a rear-facing camera (not shown) that captures a video feed (i.e., a series of image frames) of the real-world environment. The captured feed is displayed in real-time on display 210 and includes digital representations 213 and 214 of the real-world desk and couch. Additionally, the captured feed is augmented by overlaying AR objects 251 and 252 to give the appearance that objects have been placed on the desk 130.

As illustrated by FIG. 1A, digital representations 213 and 214 do not visually match the real-world objects they are representing—desk 130 and couch 140. For example, since the left side of desk 130 is visible by the user's eyes outside of the frame of mobile device 200, it should not also be visible on the display 210. This is particularly noticeable given that AR object 251 appears on the left side of the desk on display 210, but the left side of real world desk 130 is also visible outside of the display 210. As another example, because of the mobile device's wide angle lens, the displayed desk and couch are sized smaller than how they are perceived by the user's eyes 110A-100B. These differences in representation of the desk and couch on display 210 and outside of display 210 detaches the user from the AR experience. The user is not presented with an experience that shows a "window" to an augmented world. Rather they are constantly reminded that they are looking at a digital representation of the real-world that is overlaid with graphics.

Figure 1B:
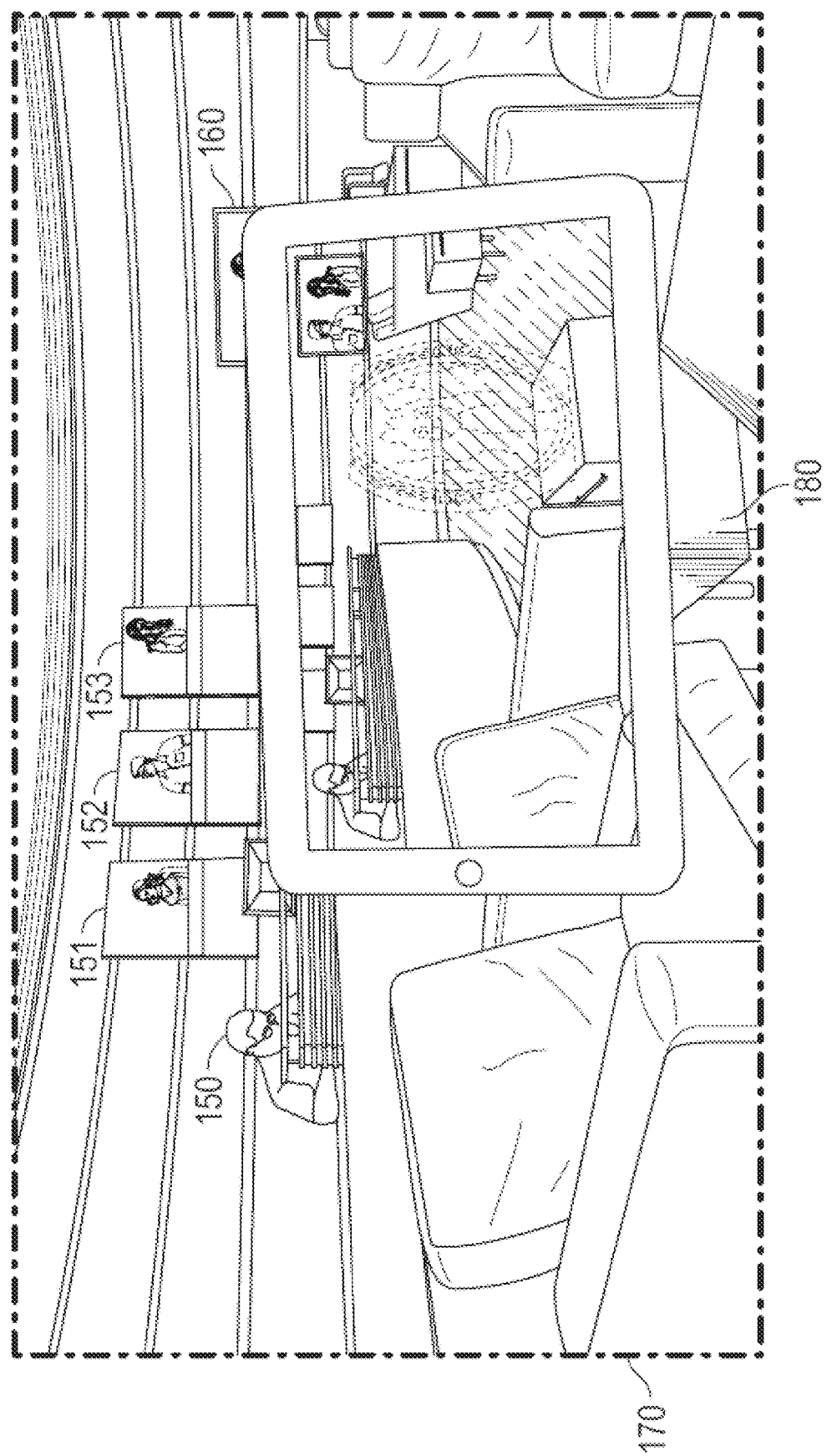
FIG. 1B illustrates another real-world environment, including a display of a handheld mobile device, as seen by a user's eyes, using a conventional video see-through AR device.

FIG. 1B provides another example of an environment in which these problems occur. As illustrated, various objects or people that already appear in the visual field of the user are duplicated on the display of the handheld mobile device. For example, the display shows digital representations of person 150, posters 151-153, and television 160. Further, the differences between the perceived real-world objects and the digitally represented real-world objects is accentuated by the smaller sizes of the digital representations of couch 170 and table 180. As video see-through mobile devices move toward bezel-less designs, these differences between the digital representation of the real-world and the user's actual visual perception may become even more noticeable, further disturbing the AR experience.

Embodiments of the technology disclosed herein are directed to addressing these problems. In accordance with implementations described herein, a more realistic augmented reality view may be presented on a video see-through display of a device by configuring the device such that the displayed image of the real world substantially matches what would be perceived by the user if the display were not present. As further described below, this may be implemented by determining a distance from the user's eyes to the display of the device, determining an angular offset between the optical axis of the rear camera of the device and the user's visual field, and using the determined distance and angular offset to adjust the image that is displayed to the user. In this manner, the view provided by the video see-through display of the device may more closely represent a "window" to an augmented world.

In some implementations, the displayed image may be adjusted by tilting the rear camera's lens and optically zooming the lens. In other implementations, the image may be adjusted by translating and digitally zooming the image generated by the image sensor coupled to the rear camera. In yet further implementations, a combination of optical adjustments to the rear camera and digital adjustments to the image may be made such that the displayed image of the real world substantially matches what would be perceived by the user if the display were not present.

Figure 2:
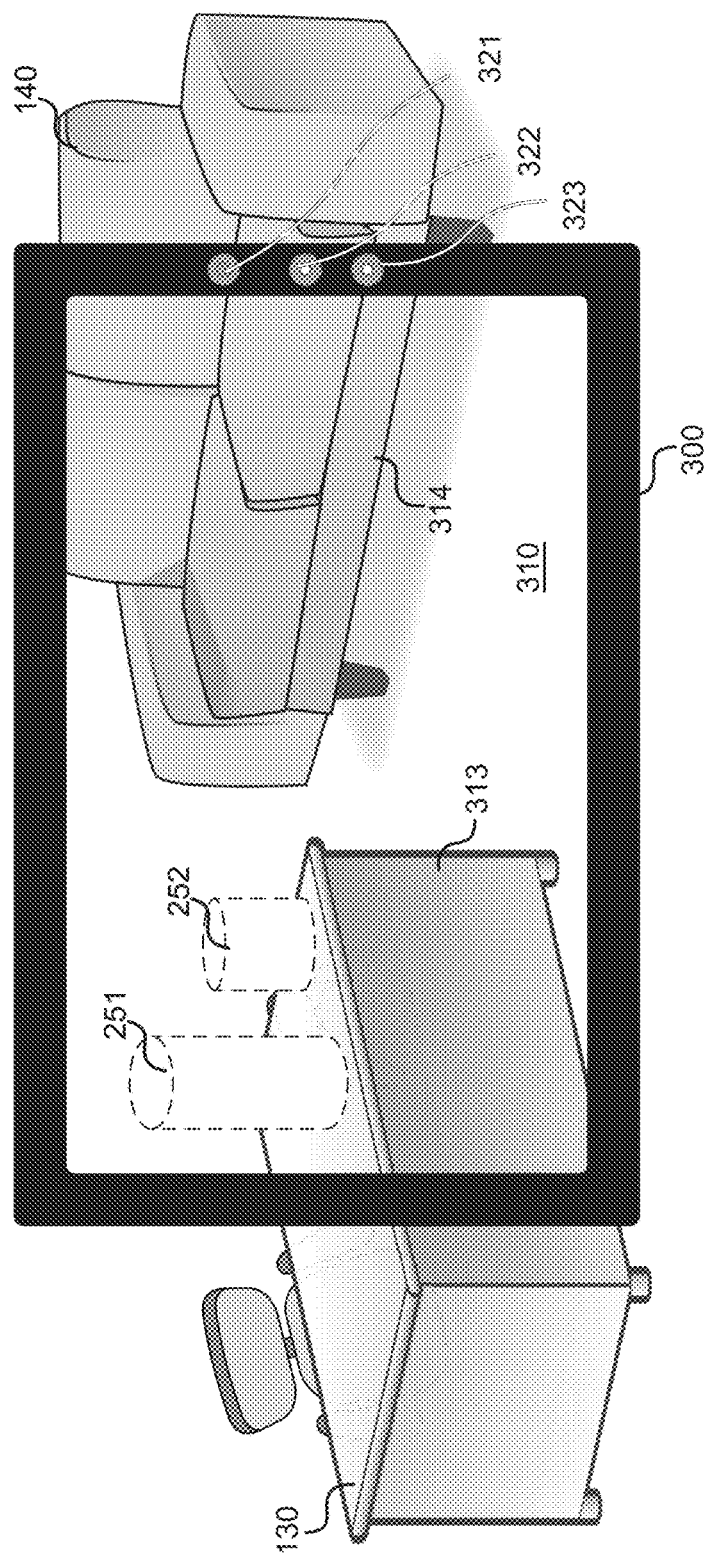
FIG. 2 shows an idealized representation of the real-world environment of FIG. 1A, including a display of a video see-through device, as would seen by a user's eyes after implementing the techniques described herein.
Figure 2:
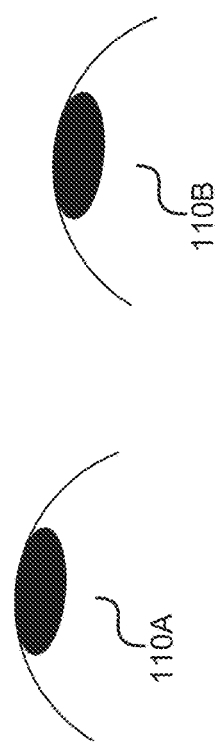

FIG. 2 shows an idealized representation real-world environment 100, including a display 310 of a video see-through device 300, as would seen by a user's eyes 110A-110B after implementing the techniques described herein. Unlike the example of FIG. 1A, digital representations 313 and 314 visually match the real-world objects they are representing—desk 130 and couch 140. The display 310 behaves more like a "window" into an AR world including AR objects 251 and 252.

Device 300 includes a rear-facing camera (not shown in FIG. 2.) that captures a video feed of the real-world environment. As further described below, depending on the position (e.g., distance and angular position) of the user's eyes 110A-110B relative to device 300, the captured feed is optically or digitally zoomed and/or optically or digitally translated such that the image displayed on display 310 substantially matches what would be perceived by the user if the display 310 were not present.

In this example embodiment, device 300 includes a front-facing infrared (IR) illuminator 321, IR camera 322, and color camera 323 that may be used to determine the position of the user's eyes relative to display 310. However, in other implementations, other position determination devices and/or photogrammetric techniques may be used to determine the position of the user's eyes relative to the display 310. After adjustment of the captured feed, it may be augmented by overlaying AR objects 251 and 252 to give the appearance that objects have been placed on desk 130.

Figure 3:
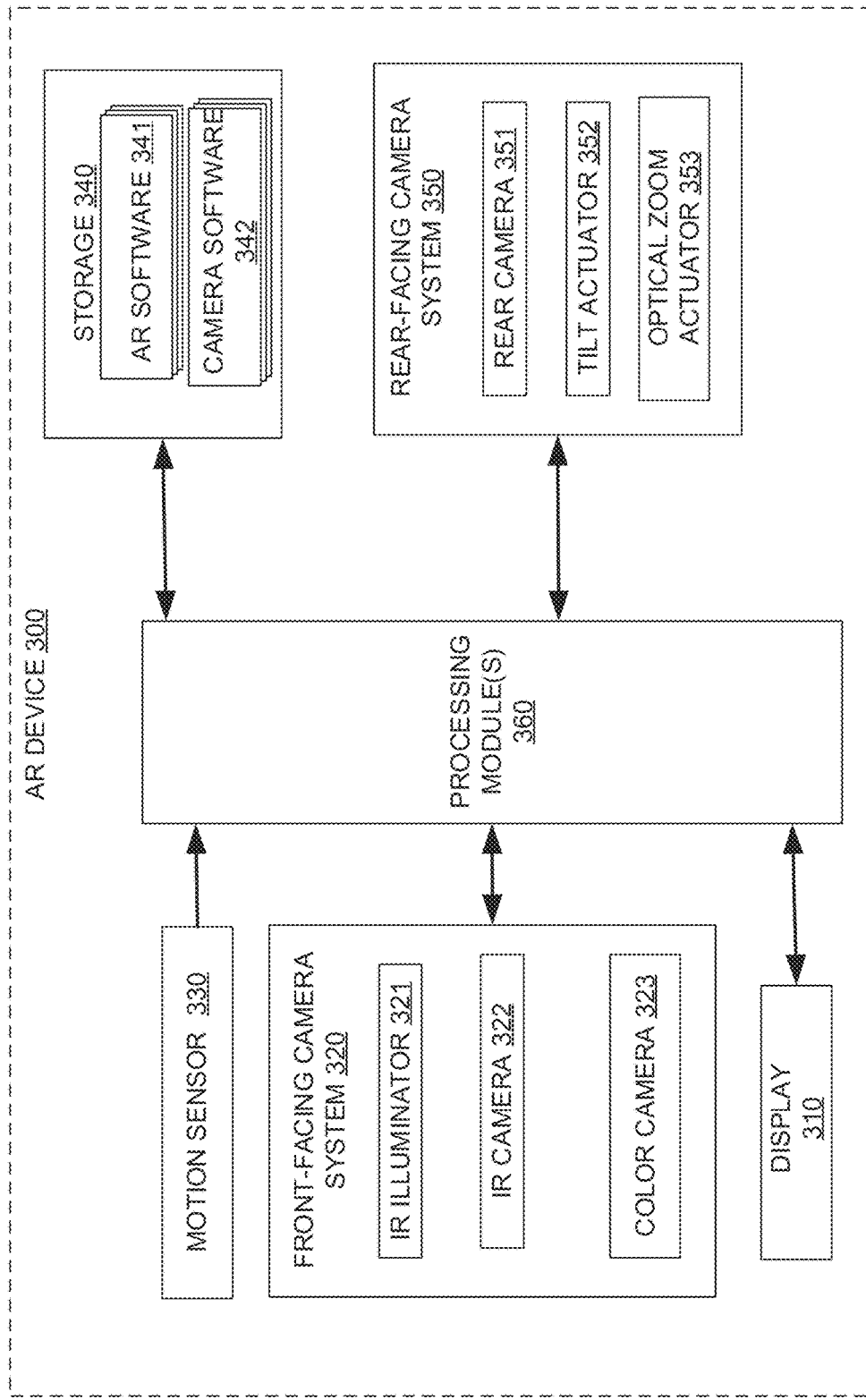
FIG. 3 is a block diagram illustrating an example architecture for components of an AR device in accordance with embodiments of the disclosure.

FIG. 3 is a block diagram illustrating an example architecture for components of an AR device 300 in accordance with embodiments of the disclosure. AR device 300 may be any video see-through AR device, including a display and rear-facing camera, that may be adjusted such that the displayed image of the real world substantially matches what would be perceived by the user if the display were not present. For example, AR device 300 may be a handheld device such as smartphone, a tablet, or a camera. Additionally, AR device 300 may be a smart television or monitor equipped with a rear-facing camera, or other video see-through device such as a video see-through head mounted display.

AR device 300 may include a display 310, front-facing camera system 320, motion sensor 330, storage 340, rear-facing camera system 350, and processing module(s) 360.

Display 310 may be a video see-through display (e.g., an OLED, LED, or LCD screen) that may display video of the user's real world environment that is overlaid with AR objects.

Storage 340 may comprise volatile memory (e.g. RAM), non-volatile memory (e.g. flash storage), or some combination thereof. Storage 340 may store camera software 342, that when executed, activates a rear camera 351 of rear-facing camera system 350 and/or a front-facing camera. Camera software 342 may be used to display a video feed of the activated camera. Storage 340 may also store AR software 341, that when executed by processing module 360 (e.g., a digital signal processor), generates an AR experience. For example, the AR experience may overlay imagery over a video feed captured by a rear camera 351 of rear-facing camera system 350. Execution of the AR software 341 may also display a graphical user interface (GUI) that permits a user to select, create, and/or register digital objects in the user's real-world environment. For example, in the case of visual digital objects, a user may select a digital object's general shape, size, orientation, texture, and color. In implementations, the camera software 342 and AR software 341 may be integrated or used as part of the same software application.

In various embodiments, further described below, AR software 341 and/or camera software 342 may be used to adjust AR device 300 (e.g., adjust rear-facing camera system 350 or adjust an image displayed on display 310) such that the displayed image of the real world substantially matches what would be perceived by the user if the display were not present. Additionally, AR software 341 and/or camera software 342 may be used to control front-facing camera system 320 to determine a position of a user's eyes relative to display 310.

Motion sensor 330 may generate electronic signals representative of the motion or position of AR device 300. These electronic input signals may be received and processed by circuitry of a processing module 360 during an AR experience to determine a motion of AR device 300 and an absolute orientation of AR device 300 in the north-east-south-west (NESW) and up-down planes. In various embodiments, motion sensor 330 may comprise one or more gyroscopes, accelerometers, and magnetometers.

Rear-facing camera system 350 may include a rear camera 351, a tilt actuator 352, and an optical zoom actuator 353. Rear camera 351 may be used to capture a video stream of the real world environment during an AR experience. The captured video stream may be encoded using a suitable video codec (e.g., H.265/MPEG-4). Additionally, AR software 341 may use the captured video stream to register AR objects with the real world environment and overlay them to create an AR presentation.

Tilt actuator 352 may be a microelectromechanical system actuator or other suitable actuator that is configured to control a tilt orientation (i.e., pointing direction) of rear camera 351. For example, during an AR experience, tilt actuator 352 may control a tilt orientation of rear camera 351 such that it aligns an optical axis of rear camera 351 with the user's visual field (e.g., by moving rear camera 351 such that its optical axis is perpendicular to the user's face or between the user's eyes). In implementations, a processing module 360 may control the operation of tilt actuator 352 during an AR experience depending on the position (e.g., angular offset) of the user's eyes relative to display 310.

Optical zoom actuator 353 may include a motor that moves the optical elements of the camera lens of rear camera 351 to change the lens' focal length (e.g., the distance between a zoom lens and the image sensor of rear camera 351). In implementations, a processing module 360 may control the operation of optical zoom actuator 353 during an AR experience depending on the position (e.g., distance) of the user's eyes relative to display 310.

Front-facing camera system 320 may include an IR illuminator 321, an IR camera 322, and a color camera 323. IR illuminator 321 may project a pattern of IR light (e.g., a pattern of IR dots) on the user's face. IR camera 322 may receive IR light reflected from the user's face to create a three-dimensional depth map of the user's face. The three-dimensional map of the user's face may be used to determine a position of the user's face and/or eyes and/or perform facial recognition. Color camera 323 may be used to capture a frontal image of the user (e.g., a selfie), and in some implementations, may be used in combination with IR camera 322 to perform facial recognition of the user and/or determination of the position of the user's face and/or eyes relative to display 310.

In implementations, front-facing camera system 320 may be used to scan the user's face and create a facial profile that is used to estimate the position (e.g., distance and angular position) of the user's face and/or eyes relative to the display 310. Additionally, in some implementations, the facial profile may be used to determine an interpupillary distance of the user (i.e., distance between center of pupils of the two eyes), which may be used by the AR device 300 to estimate the user's visual field depending on the position of the user's face.

In other implementations, other position determination devices may be used in place of IR illuminator 321 and IR camera 322 to determine the position (e.g., distance and angular position) of the user's eyes and/or face relative to the display 310. For example, optical, infrared, or ultrasonic sensors may be used to determine a distance and angular position of the user's face relative to the display 310. Additionally, in some implementations, photogrammetric techniques may be used in combination with color camera 323 to make this determination.

Figure 4:
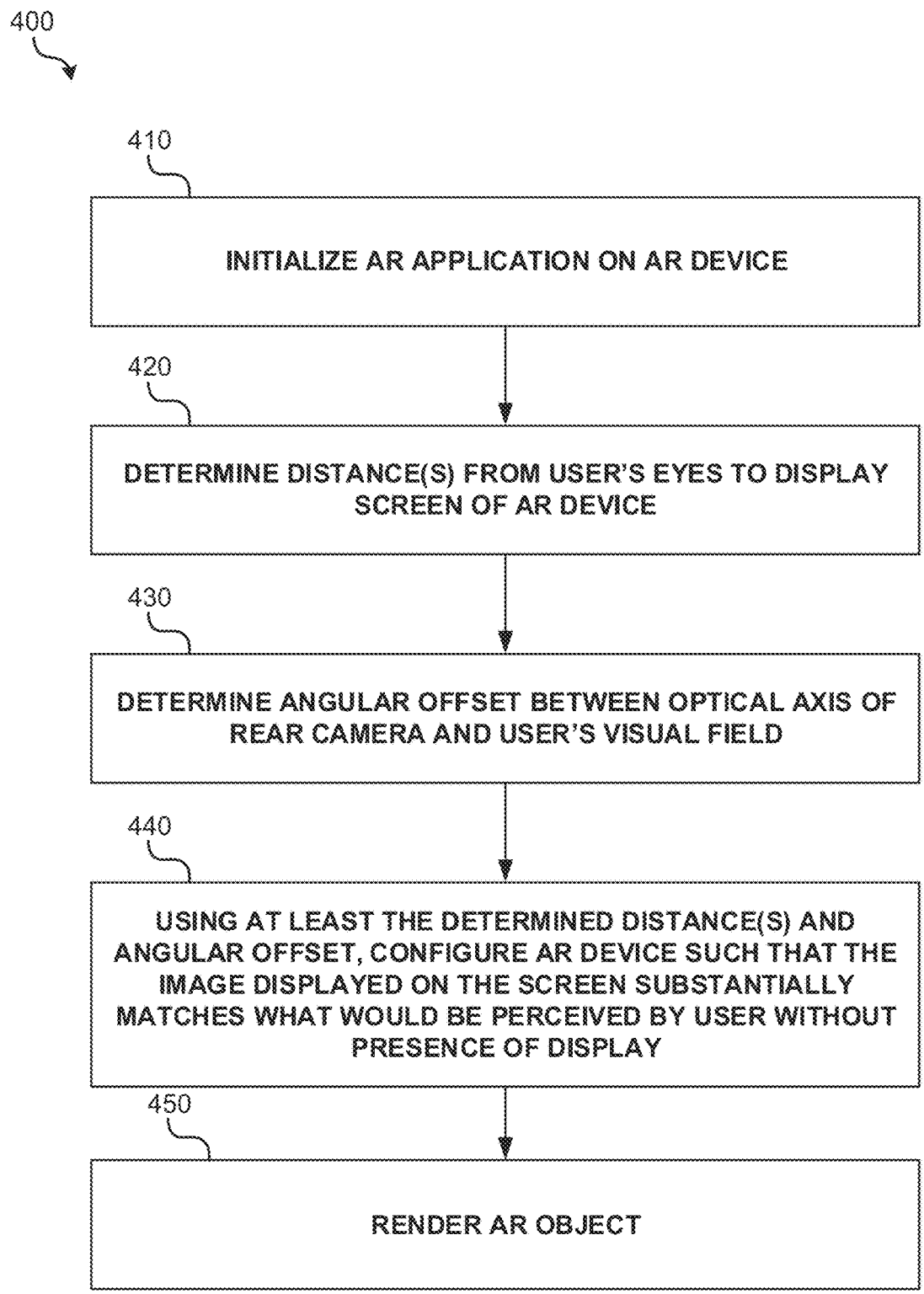
FIG. 4 is an operational flow diagram illustrating an example method that may be implemented by the AR device of FIG. 3 in accordance with embodiments.

FIG. 4 is an operational flow diagram illustrating an example method 400 that may be implemented by AR device 300 in accordance with embodiments. For example, method 400 may be implemented by a processor executing AR software 341 and/or camera software 342. Prior to implementing method 400, AR device 300 may determine an interpupillary distance of the user (e.g., by using front-facing camera system 320).

At operation 410, an AR software application may be initialized on AR device 300. The AR software application may be used to overlay graphics or other AR objects over a video feed captured using rear camera 351. In some implementations, initialization of the AR software application may also activate rear camera 351. Additionally, as further described below, the AR application may configure the AR device (e.g., by causing movement of optical components of camera 351 and/or adjustment of the displayed image of the video feed) such that an image displayed on display 310 substantially matches what would be visually perceived by the user if the display 310 were not present.

At operation 420, one or more distances from the user's eyes to the display 310 of AR device 300 may be determined. For example, a distance from the center of display 310 to a point centered between the user's eyes may be determined. As another example, a distance from each of the corners of display 310 to a point centered between the user's eyes may be determined. As yet another example, distances may be determined from the center of each eye (e.g. from the pupil) to different points on the display 310 (e.g., the center and/or corners of the display).

In implementations, the distances from the user's eyes to display 310 may be determined using front-facing camera system 320. For example, IR illuminator 321 and IR camera 322 may be used to create a three-dimensional depth map of the user's face, including the user's eyes. This depth map may be used to determine one or more distances from the user's eyes to the display 310 using parameters such as the display's size and dimensions and a known position of components of the frontal-facing camera system 320 (e.g., the IR illuminator 321 and IR camera 322) relative to the display 310.

In another embodiment, given a known or predetermined interpupillary distance of the user, the distances from the user's eyes to the display 310 may be determined by applying photogrammetric techniques to a live image of the user's face captured using color camera 323. For example, given a known focal length of the camera lens, there is a correspondence to the distance between the user's eyes and the distance from the camera, with a slight variation owing to age, genetic makeup, etc., that could be adjustable by the user, or ignored depending on the impact to the AR experience.

At operation 430, an angular offset between an optical axis of the rear camera 351 and the user's visual field may be determined. For example, if the user's visual field is not centered or focused along substantially the same optical axis as the rear camera's FOV, there may be an angular offset between the camera's optical axis and the user's visual field along horizontal and/or vertical directions. In implementations, this angular offset may be determined using the three-dimensional depth map discussed above. For example, the angular offset may be determined based on differences between the distances discussed above.

In implementations, the position of the user's eyes above, below, and/or to the sides of the camera's center, as well as the angle of a line defined by the eye centroids, may be used to determine the angular offset.

Figure 5:
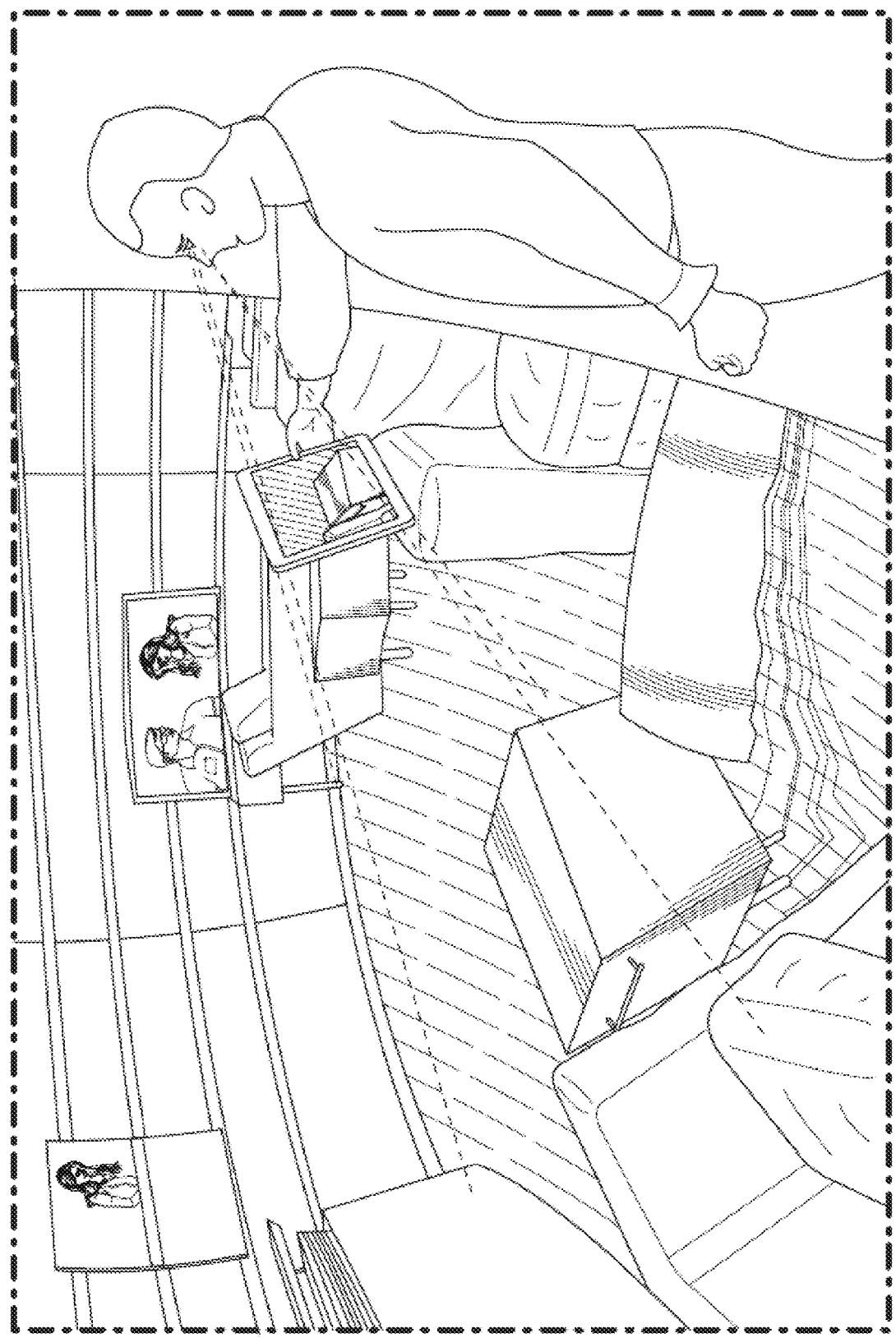
FIG. 5, shows an angular region of a user's visual field running through a display of a handheld mobile device.

Following determination of the one or more distances and angular offset (if any), at operation 440 the determined one or more distances and angular offset may be used to configure the AR device such that the image displayed on the display screen 310 substantially matches the image that would be perceived by the user in the location of the display screen if it were not present. For example, as further described below, the feed captured by rear camera 351 may be optically or digitally zoomed and/or optically or digitally translated such that the image displayed on display 310 substantially matches what would be perceived by the user if the display 310 were not present. This is illustrated by FIG. 5, which shows an angular region of a user's visual field running through a display of a handheld mobile device.

At operation 450, AR objects may be rendered on a live feed of rear camera 351. For example, AR objects may be visually overlaid over real world objects shown on the live feed after the live feed has been adjusted to account for the one or more determined distances and angular offset.

Figure 6A:
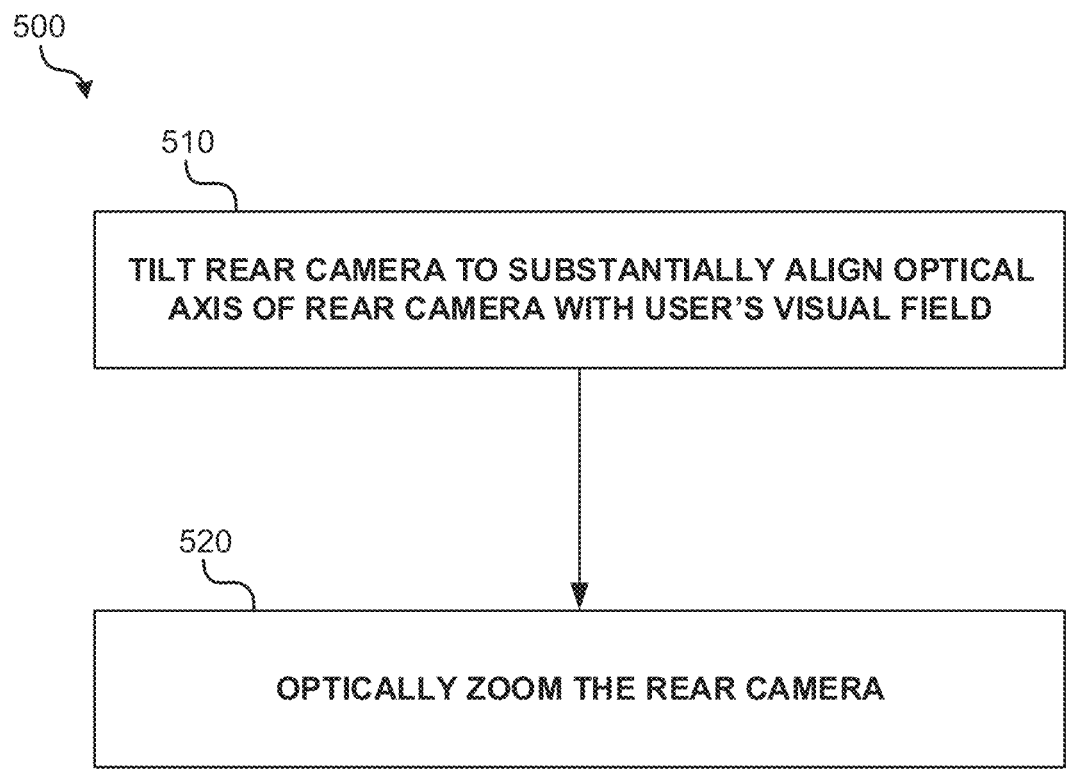
FIG. 6A is an operational flow diagram illustrating an example optical adjustment method 500 that may be implemented in accordance with embodiments to adjust the live feed of a rear camera such that an image displayed on a display screen substantially matches what would perceived by the user if the display screen were not present.
Figure 6B:
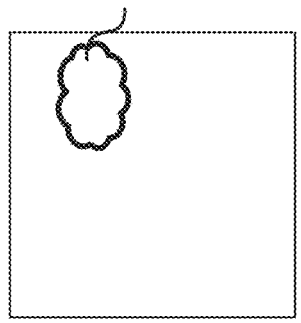
FIG. 6B illustrates differences between what would be perceived by a user's eyes within a location of the display screen, if it were not present, and the image that is displayed on the display screen prior to implementing the method of FIG. 6A.
Figure 6B:
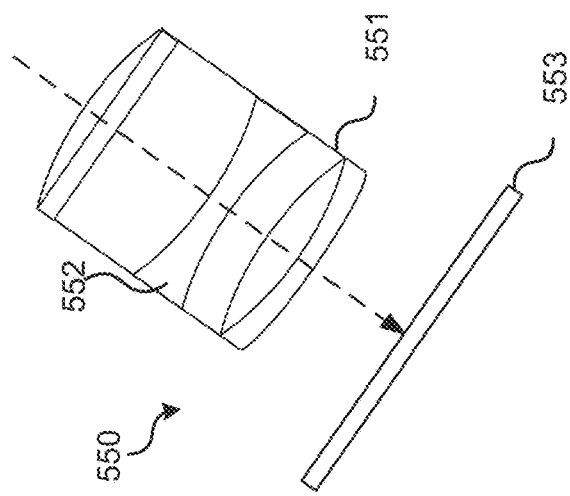
Figure 6B:
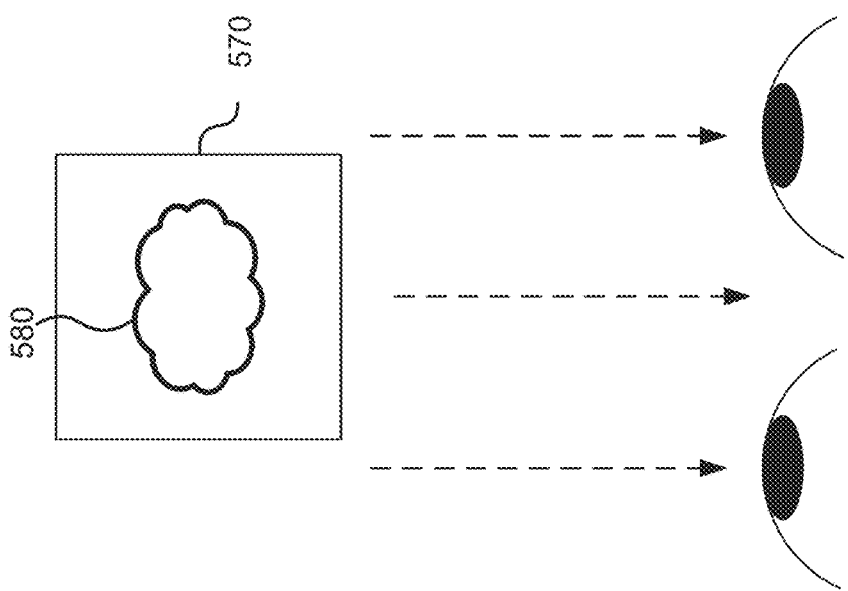

FIG. 6A is an operational flow diagram illustrating an example optical adjustment method 500 that may be implemented to adjust the live feed of a rear camera such that an image displayed on a display screen substantially matches what would perceived by the user if the display screen were not present. FIG. 6A will be described in conjunction with FIGS. 6B-6C. FIG. 6B illustrates differences between what would be perceived by a user's eyes within angular region 570 (i.e., the location of the display screen) without the display screen present, and the image that is displayed on the display screen prior to implementing method 500. As illustrated, without the display screen, the user would perceive an object 580 centered on angular region 570. By contrast, the digital image of object 580 that is displayed on the display screen shows object 580 off-center and smaller than how it would be perceived by the user without the display screen.

Figure 6C:
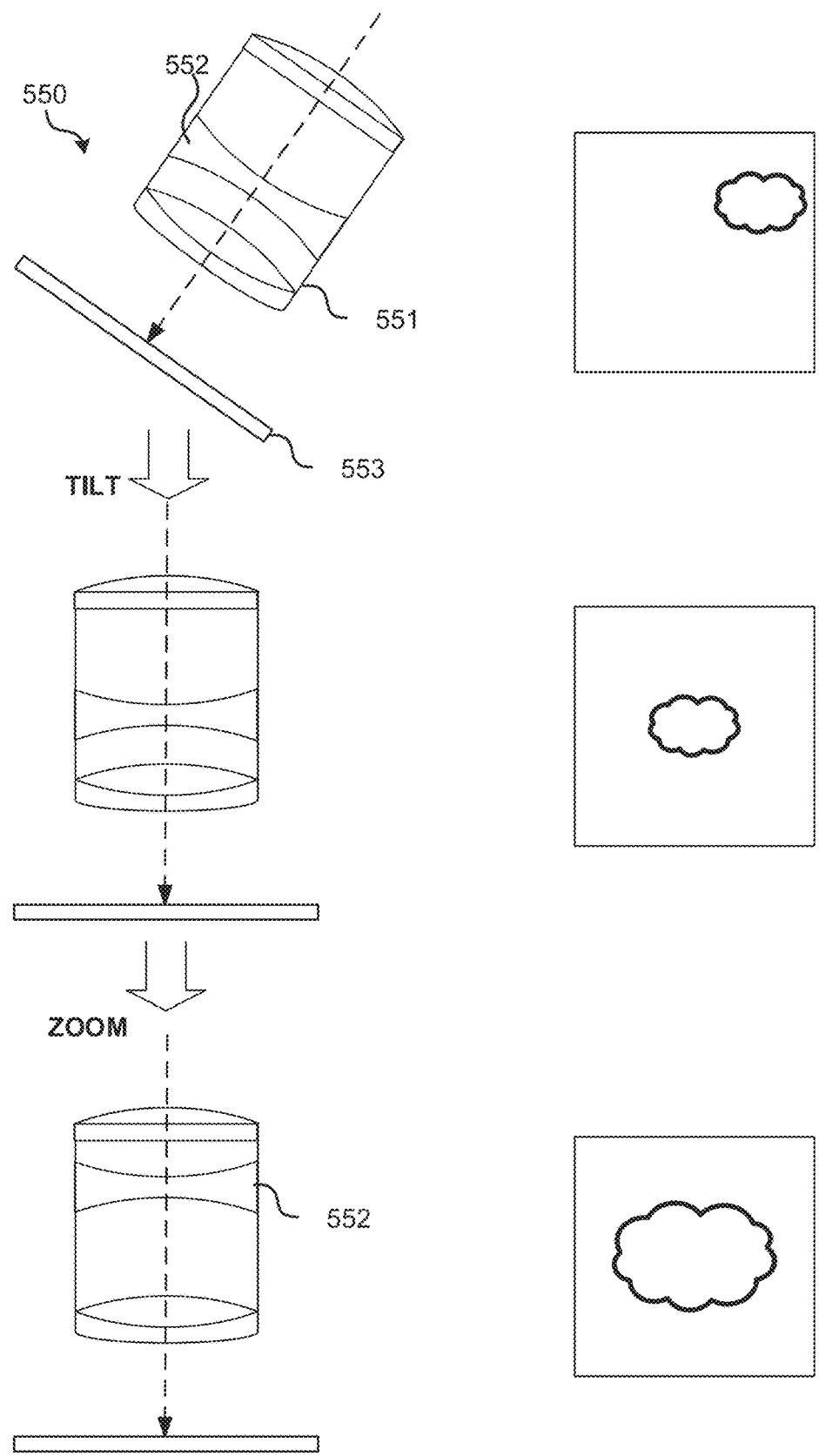
FIG. 6C visually illustrates the method of FIG. 6A.

At operation 510, a tilt actuator may be used to tilt rear camera 550 such that an optical axis of rear camera 550 is substantially aligned with the user's visual field. As illustrated in the example of FIG. 6C, the camera 550, including lens 551 and image sensor 553, may be tilted to align the optical axis of the camera with the user's field of vision. After alignment, the digital image of object 580 that is displayed on the display screen is centered. This alignment, in various embodiments, may be based on the determined angular offset described above. For example, if the user's visual field is offset 10 horizontal degrees from the camera's optical axis, the tilt actuator may tilt the camera 10 horizontal degrees. Alternatively, if there is no angular offset, operation 510 may be skipped.

At operation 520, an optical zoom actuator (not shown) may be used to optically zoom rear camera 552 such that the size of the angle of view or field of view (FOV) projected on camera 552's image sensor 553 and displayed on the display substantially corresponds to what would be perceived by the user at the display's location without the display. This zoom adjustment, in various embodiments, may be based on the determined distances described above. As shown in the example of FIG. 6C, a zoom lens 552 of camera lens 551 is translated to increase the focal length of the camera (i.e., "zoom in"). After zooming in, the displayed image of object 580 substantially corresponds to what would perceived by the user if the display screen were not present.

Figure 7A:
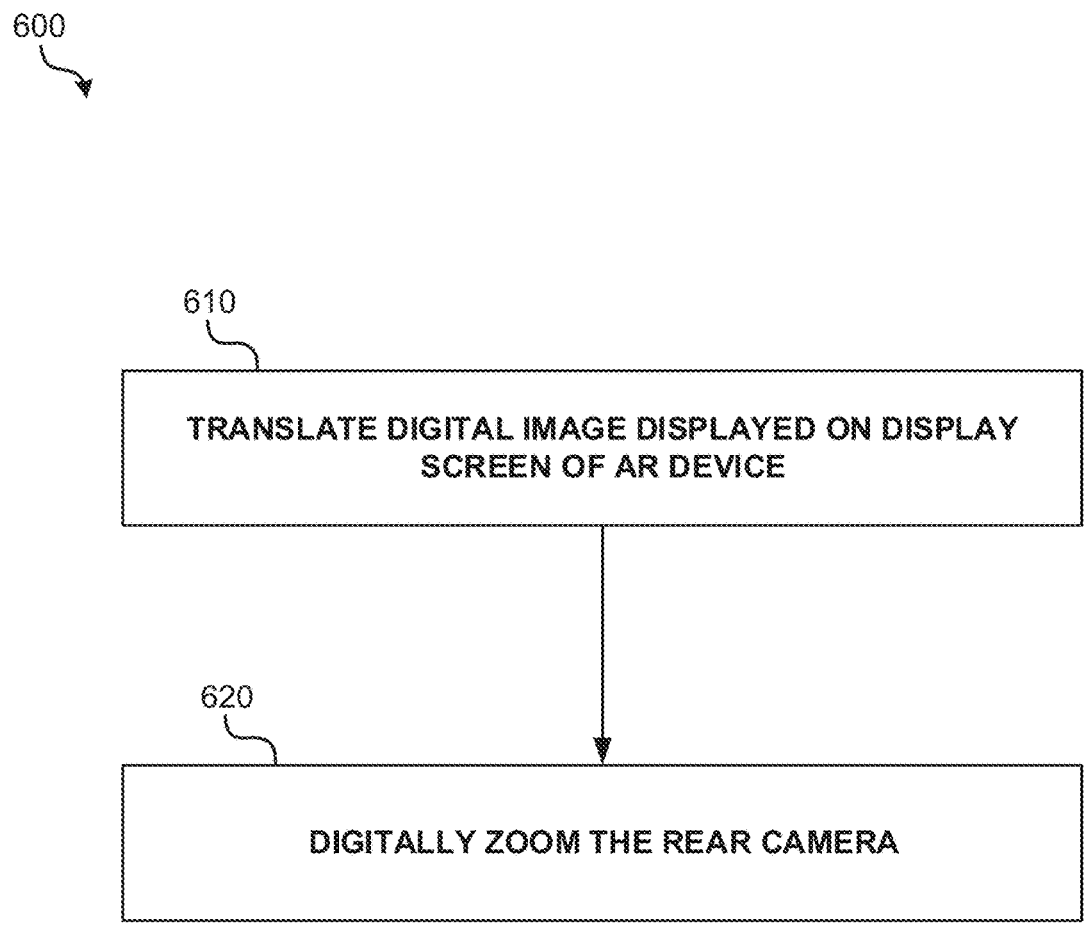
FIG. 7A is an operational flow diagram illustrating an example digital adjustment method that may be implemented in accordance with embodiments to adjust the live feed of a rear camera such that an image displayed on a display screen substantially matches what would perceived by the user if the display screen were not present.
Figure 7B:
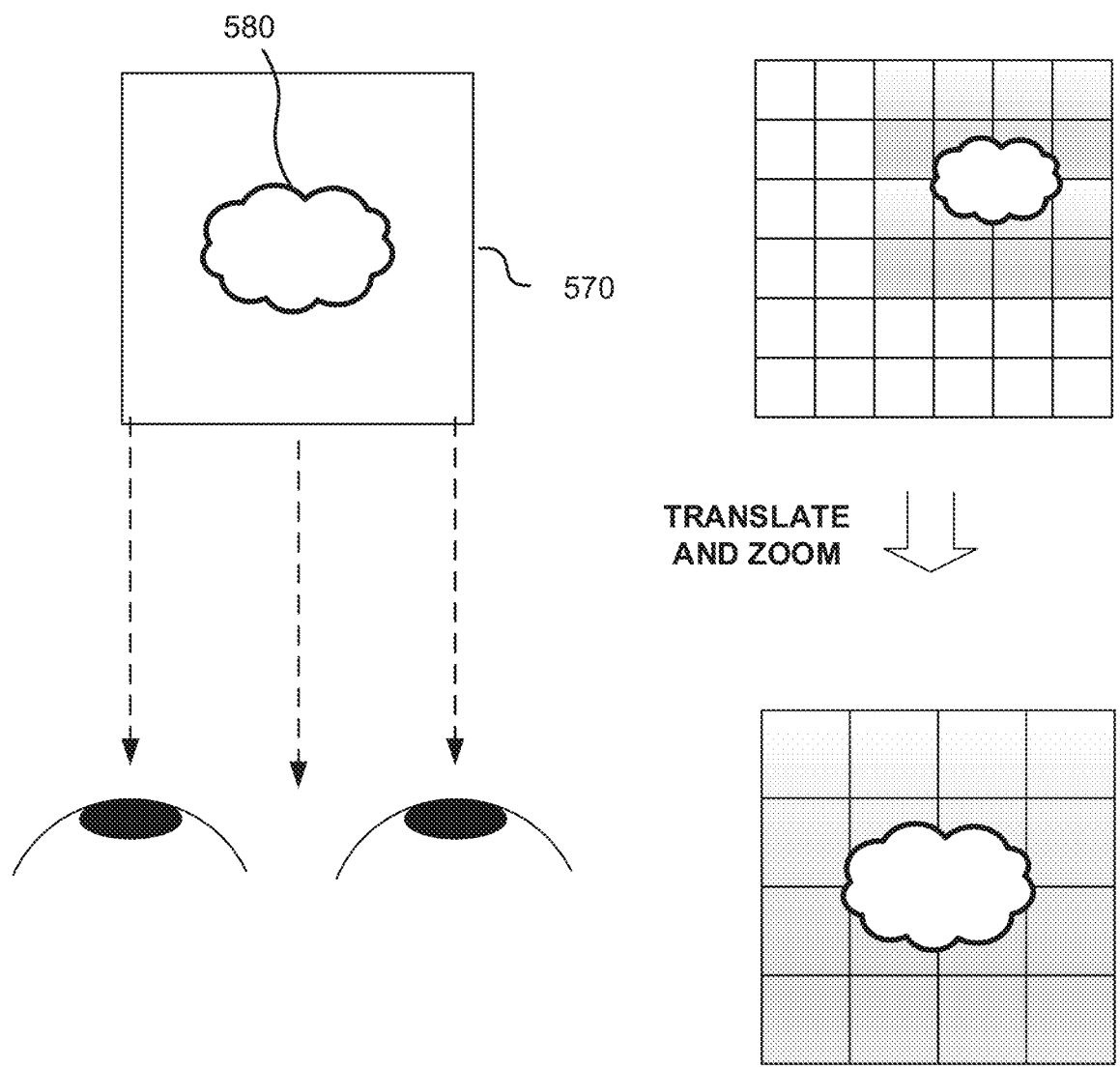
FIG. 7B visually illustrates the method of FIG. 7A.

FIG. 7 is an operational flow diagram illustrating an example digital adjustment method 600 that may be implemented to adjust the live feed of a rear camera such that an image displayed on a display screen substantially matches the user's visual field. For example, method 600 may be implemented when the rear-camera has a fixed focal length and/or a fixed optical axis. FIG. 7A will be described in conjunction with FIG. 7B, which illustrates differences between what would be perceived by a user's eyes within angular region 570 (i.e., the location of the display screen) without the display screen present, and the image that is displayed on the display screen prior to and after implementing method 600. In the example of FIG. 7B, the image is illustrated as a grid of pixels for the purpose of illustration. As illustrated, without the display screen, the user would perceive an object 580 centered on angular region 570. By contrast, the digital image of object 580 that is displayed on the display screen, prior to implementing method 600, shows object 580 off-center and smaller than how it would be perceived by the user without the display present.

At operation 610, the image that is displayed on the display screen may be translated. This adjustment, in various embodiments, may be based on the determined angular offset described above. For example, as illustrated by FIG. 7B, the image is re-centered on the shaded pixels surrounding digital image object 580.

At operation 620, the displayed image feed may be digitally zoomed (i.e., the size of the displayed pixels may be enlarged or reduced) such that the size of the FOV displayed on the display substantially corresponds to what would be perceived by the user at the display's location if the display were not present. This digital zoom adjustment, in various embodiments, may be based on the determined distances described above. As shown in the example of FIG. 7B, the displayed, shaded pixels are enlarged to digitally zoom in.

In some embodiments, both optical and digital adjustments may be made to adjust the image that is displayed on the display. For example, in some implementations, the rear camera may be tilted and the captured image may be digitally zoomed. In other implementations, the displayed image may be translated while the rear camera is optically zoomed. In yet further implementations, the displayed image may be adjusted by performing a combination of both optical and digital zoom, and/or a combination of both tilting the rear camera actuator and translating the image.

In some embodiments, further adjustments may be applied to the displayed image beyond translation and zoom. For example, optical distortion correction algorithms may be applied to the displayed image to account for optical distortion of the camera lens and differences between human visual processing and machine visual processing.

Figure 8:
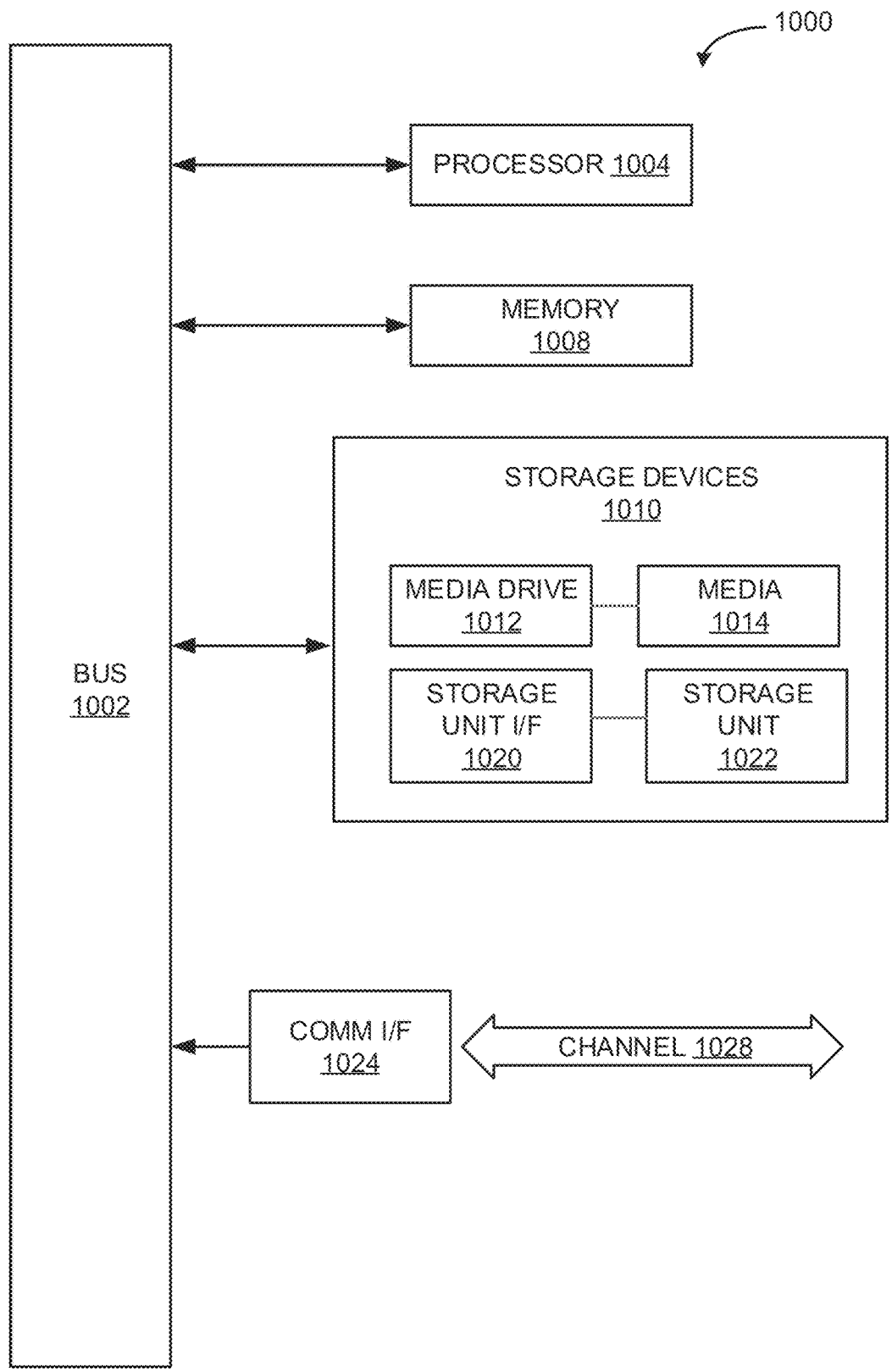
FIG. 8 illustrates an example computing module that may be used to implement various features of the methods disclosed herein.

FIG. 8 illustrates an example computing module that may be used to implement various features of the methods disclosed herein.

As used herein, the term module might describe a given unit of functionality that can be performed in accordance with one or more embodiments of the present application. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the application are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 1000. After reading this description, it will become apparent to a person skilled in the relevant art how to implement the application using other computing modules or architectures.

Referring now to FIG. 8, computing module 1000 may represent, for example, computing or processing capabilities found within desktop, laptop, notebook, and tablet computers; hand-held computing devices (tablets, PDA's, smart phones, cell phones, palmtops, etc.); mainframes, supercomputers, workstations or servers; or any other type of special-purpose or general-purpose computing devices as may be desirable or appropriate for a given application or environment. Computing module 1000 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 1000 might include, for example, one or more processors, controllers, control modules, or other processing devices, such as a processor 1004. Processor 1004 might be implemented using a general-purpose or special-purpose processing engine such as, for example, a microprocessor, controller, or other control logic. In the illustrated example, processor 1004 is connected to a bus 1002, although any communication medium can be used to facilitate interaction with other components of computing module 1000 or to communicate externally.

Computing module 1000 might also include one or more memory modules, simply referred to herein as main memory 1008. For example, preferably random access memory (RAM) or other dynamic memory, might be used for storing information and instructions to be executed by processor 1004. Main memory 1008 might also be used for storing temporary variables or other intermediate information during execution of instructions to be executed by processor 1004. Computing module 1000 might likewise include a read only memory ("ROM") or other static storage device coupled to bus 1002 for storing static information and instructions for processor 1004.

The computing module 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid state drive, a magnetic tape drive, an optical disk drive, a CD or DVD drive (R or RW), or other removable or fixed media drive might be provided. Accordingly, storage media 1014 might include, for example, a hard disk, a solid state drive, magnetic tape, cartridge, optical disk, a CD, DVD, or Blu-ray, or other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing module 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory module) and memory slot, a PCMCIA slot and card, and other fixed or removable storage units 1022 and interfaces 1020 that allow software and data to be transferred from the storage unit 1022 to computing module 1000.

Computing module 1000 might also include a communications interface 1024. Communications interface 1024 might be used to allow software and data to be transferred between computing module 1000 and external devices. Examples of communications interface 1024 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 1024 might typically be carried on signals, which can be electronic, electromagnetic (which includes optical) or other signals capable of being exchanged by a given communications interface 1024. These signals might be provided to communications interface 1024 via a channel 1028. This channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium", "computer usable medium" and "computer program medium" are used to generally refer to non-transitory media, volatile or non-volatile, such as, for example, memory 1008, storage unit 1022, and media 1014. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 1000 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

While various embodiments of the present disclosure have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present disclosure. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosure, whether or not such embodiments are described and whether or not such features are presented as being a part of a described embodiment. Thus, the breadth and scope of the present disclosure should not be limited by any of the above-described exemplary embodiments.

What is claimed is:

1. A method for displaying augmented reality content to a user of an augmented reality (AR) device, the method comprising:
   capturing a video feed of a real-world environment, using a rear-facing camera of the AR device, wherein the rear-facing camera faces away from a face of the user;
   estimating a visual field of the user based on at least a position of a first eye of the user and a position of a second eye of the user relative to the AR device, using a front-facing camera that faces towards the face of the user, wherein the AR device includes a display;
   determining an angular offset between an optical axis of the rear-facing camera and the visual field;
   modifying a characteristic of the rear-facing camera based on at least the angular offset such that a display of the video feed by the AR device substantially corresponds to the visual field, wherein modifying the characteristic of the rear-facing camera comprises tilting the rear-facing camera to align the optical axis with the visual field; and
   rendering, on the display, an augmented reality object overlaid on the video feed, wherein the augmented reality object is registered with the real-world environment.

2. The method of claim 1, wherein modifying the characteristic of the rear-facing camera further comprises optically zooming the display of the video feed by translating a zoom lens of the rear-facing camera.

3. The method of claim 1, wherein modifying the characteristic of the rear-facing camera further comprises digitally zooming the display of the video feed.

4. The method of claim 1, wherein the AR device comprises a handheld video see-through AR device.

5. The method of claim 1, wherein estimating the visual field of the user comprises scanning the face of the user using a front-facing infrared illuminator and an infrared camera of the AR device.

6. The method of claim 1, wherein modifying the characteristic of the rear-facing camera further comprises digitally translating the video feed.

7. A device, comprising:
   a display;
   a rear-facing camera;
   a processor; and
   a non-transitory computer-readable medium having instructions stored thereon that, when executed by the processor, causes the device to:
   capture a video feed of a real-world environment using the rear-facing camera;
   display the video feed on the display;
   estimate a visual field of a user wearing the device based on at least a position of a first eye of the user and a position of a second eye of the user relative to the device;
   determine an angular offset between an optical axis of a front-facing camera and the visual field of the user;
   modify a characteristic of the rear-facing camera based on at least the angular offset such that the displayed video feed substantially corresponds to the visual field, wherein modifying the characteristic of the rear-facing camera comprises mechanically tilting the rear-facing camera; and
   render an augmented reality object overlaid over the displayed video feed, wherein the augmented reality object is registered with the real-world environment.

8. The device of claim 7, wherein the rear-facing camera comprises a zoom lens, wherein modifying the characteristic of the rear-facing camera further comprises optically zooming the displayed video feed by translating the zoom lens.

9. The device of claim 7, wherein modifying the characteristic of the rear-facing camera further comprises digitally zooming the displayed video feed.

10. The device of claim 7, wherein the device comprises a handheld video see-through augmented reality device.

11. The device of claim 7, further comprising a front-facing camera system including an infrared illuminator and an infrared camera, wherein estimating the visual field of the user includes scanning a face of the user using the infrared illuminator and the infrared camera.

12. The device of claim 7, wherein modifying the characteristic of the rear-facing camera further comprises digitally translating the displayed video feed.

13. The device of claim 7, further comprising a tilt actuator, wherein modifying the characteristic of the rear-facing camera includes tilting the rear-facing camera with the tilt actuator.

14. The device of claim 7, wherein modifying the characteristic of the rear-facing camera further comprises digitally translating the displayed video feed.

15. A method for displaying augmented reality content to a user of an augmented reality (AR) device, the method comprising:
   capturing and displaying a video feed of a real-world environment using a rear-facing camera of the AR device;
   generating a facial profile of the user by scanning a face of the user;
   determining, with the facial profile, a position of a first eye of the user and a position of a second eye of the user relative to a display of the AR device;
   based on at least the position of the first eye of the user and the position of the second eye of the user relative to the AR device, estimating a visual field of the user;
   determining an angular offset between an optical axis of the rear-facing camera and the visual field of the user;
   based on at least the angular offset, tilting the rear-facing camera to align the optical axis with the visual field to match the displayed video feed to an image of the real-world environment that would be perceived by the user without a presence of the display; and
   after tilting the rear-facing camera or digitally translating the video feed, rendering an augmented reality object overlaid over the video feed.

16. The method of claim 1, wherein modifying the characteristic of the rear-facing camera further comprises optically zooming the displayed video feed.

* * * * *